United States Patent [19]

Carrarini

[11] 3,956,597

[45] May 11, 1976

[54] SPEAKING TIME KEEPER

[76] Inventor: Aldo Carrarini, Via Santa Viola, 13, Tivoli, Italy

[22] Filed: Mar. 5, 1974

[21] Appl. No.: 448,392

[30] Foreign Application Priority Data

Mar. 6, 1973 Italy ................................ 48635/73

[52] U.S. Cl. ........................ 179/100.1 C; 179/6 TA; 360/12

[51] Int. Cl.² .................... G11B 19/00; G11B 23/30

[58] Field of Search.... 179/100.1 C, 6 TA, 100.1 R; 360/12, 105, 106, 87, 100

[56] References Cited

UNITED STATES PATENTS

| | | | |
|---|---|---|---|
| 2,138,890 | 12/1938 | Solberg | 179/100.1 C |
| 2,862,065 | 11/1958 | Franklin | 179/100.1 C |
| 3,023,404 | 2/1962 | Dickerson | 360/77 |
| 3,440,358 | 4/1969 | Stenby | 360/12 |
| 3,592,968 | 7/1971 | Ogawa | 179/6 R |
| 3,767,864 | 10/1973 | Smith | 360/12 |
| R21,111 | 6/1939 | Franklin | 179/6 TA |

*Primary Examiner*—Vincent P. Canney
*Attorney, Agent, or Firm*—Newton, Hopkins & Ormsby

[57] ABSTRACT

An apparatus for the listening to words representative of measurements of physical quantities according to which the measurements of said quantities are listened at time intervals controlled by a timer adjustable to operate at chosen time intervals, by means of at least one reading head reading recordings of said measurements, each obtained on the side surface of a revolving record cylinder along a circumferential track, said tracks being spaced away from each other at predetermined equal distances, the reading heads being associated with reproduction circuits.

6 Claims, 5 Drawing Figures

IV
220V
A.C
8
2
20
5
15
28
8a
9a
123
26
6
16
24
25
6a
16a
9
3
13d
17a
14a
13
12
10
17
5a
14
13a
22
13b
11
20a
27
7
18d
18a
11a
10a
18b
12a
19
18c
IV
21
13c
29
19a

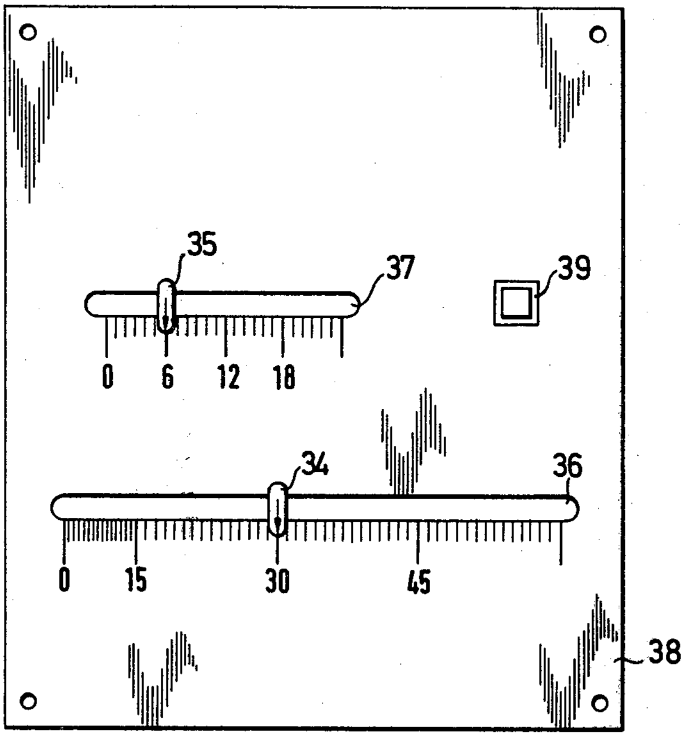
Fig.2
Fig. 3
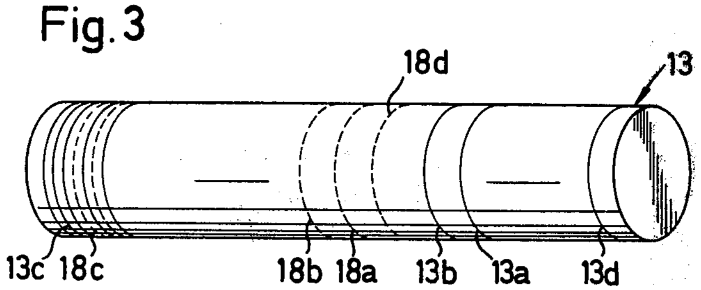

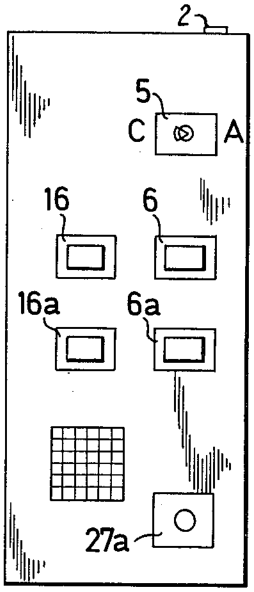
Fig.4
Fig.5
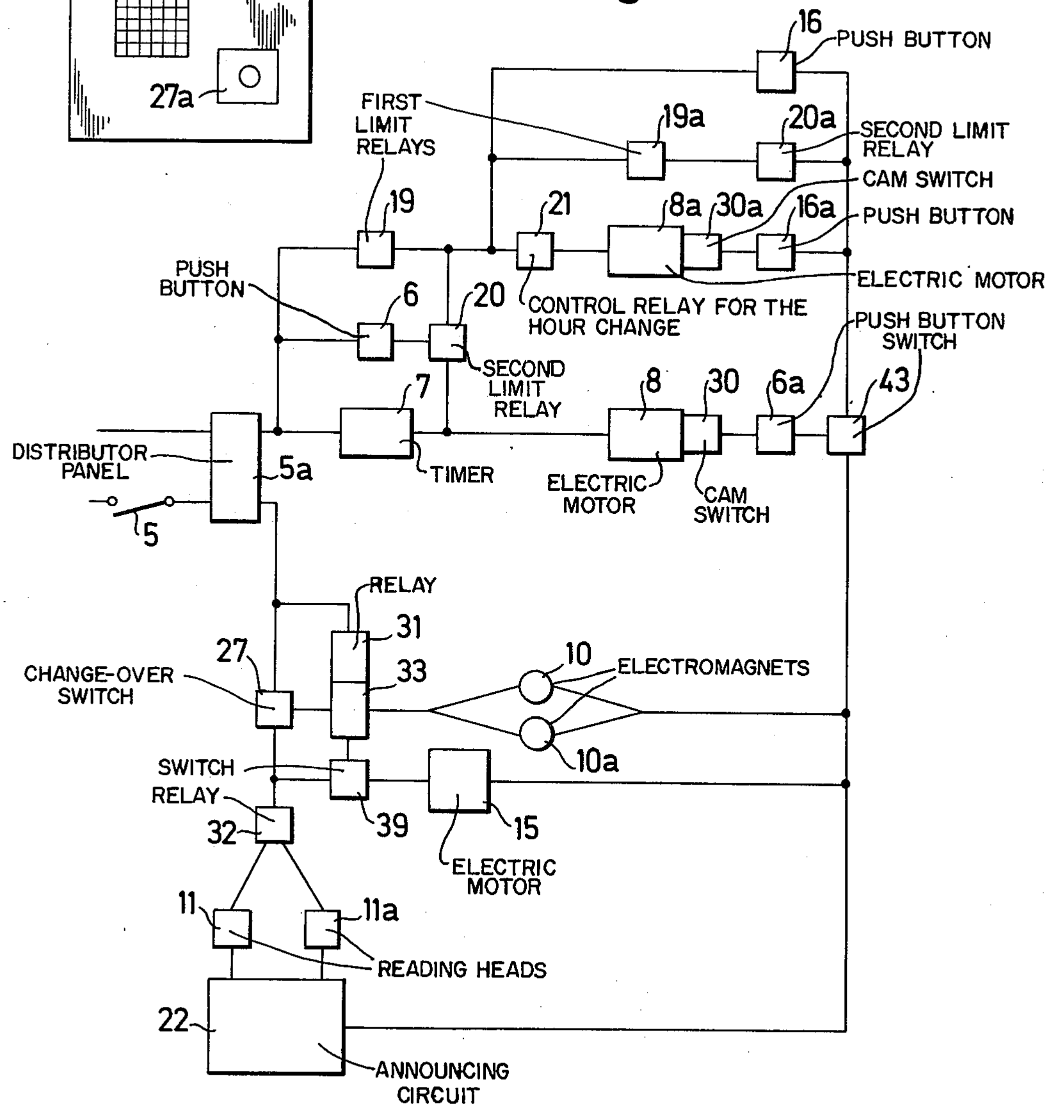

SPEAKING TIME KEEPER

The present invention concerns in particular time keepers adapted to announce the right hour and minutes according to a method for measuring the time and for audition of the hour and minute corresponding to the instant of said measuring, the time measurements being previously recorded on a record cylinder.

On this cylinder, unlike the well known Edison's cylinder on which any recording is continuously recorded along a helical track, the recordings are recorded along circumferential tracks spaced away from each other and which can be reproduced using the apparatus of the invention. On the recording cylinder of this invention it is theorically possible to obtain whichever number of annular recording tracks spaced away properly from each other, said number being only limited by the space required to position the electromechanical components of the apparatus. Said recordings, which according to one embodiment of the invention are constituted of the numbers indicating the hours and minutes respectively, can be periodically repeated or are repeatible at any desired instant by means of appropriate reproduction electric and mechanical circuits during time intervals which depend upon the chosen interval only.

The apparatus of the present invention performance offers similar to those of the common time keepers (alarm clocks, clocks in general, electronic clocks, etc.), other that the watches.

All these types of clocks have the disadvantage that they can be seen and when that would be not possible, as in the case wherein there is no sufficient visibility (for instance, during the night or when the electric energy feeding is suspended) or when blind persons are concerned, they become useless.

Methods and apparatus are known by means of which it is possible to hear what is the time, and which are based on recordings effected on tapes or discs. These methods, which are employed, for instance, to communicate the right hour to telephone subscribers users require complicated recording apparatus, since it is necessary to record all the hours of a day as well as all the respective minutes concerning the whole period of twenty four hours.

It is an object of this invention to provide a method enabling to announce what time it is with the accuracy of one minute and which does not require the use of the methods according to which it is necessary to record all the hours and for each hour all the minutes which are comprised in one hour.

It is another object of this invention to provide an apparatus by means of which it is possible to know what time it is with the accuracy of one minute and which does not require the use of any complicated recorder recording on tapes or discs as well as the recording of the whole number of the hours of a day and for each hour of the whole number of the minutes comprised therein.

It is another object of this invention to provide a speaking time keeper which can be listened to know what time it is with the accuracy of one minute in the case of lacking of the visibility necessary to look on common clocks or which can be used by persons devoid of sight.

It is a still further object of this invention to provide a speaking time keeper in which the recording of the numbers representative of the hours and minutes is performed on the side surface of a record cylinder according to a special method wherein is only necessary to record the numbers representative of the minutes comprised in one hour and those of the twenty four hours of the day.

It is a still another object of this invention to provide a record cylinder on which may be recorded beside the numbers representative of the hours and minutes other sentences which can be heard by means of appropriate electric or mechanical circuits at whichever desired instant and up to the deenergization of the announcing circuit.

The apparatus of this invention will be more completely understood by the following description of one embodiment of the invention, reference being made to the accompanying drawings, in which:

FIG. 2 shows the plan view of the cover of the casing of the apparatus of this invention;

FIG. 3 is a perspective view of the record cylinder of this invention;

FIG. 4 shows the front wall of the apparatus where are mounted the pushbuttons to be used during the operation of the apparatus;

FIG. 5 is a block electric circuit diagram of the apparatus according to the invention.

Figure 1:
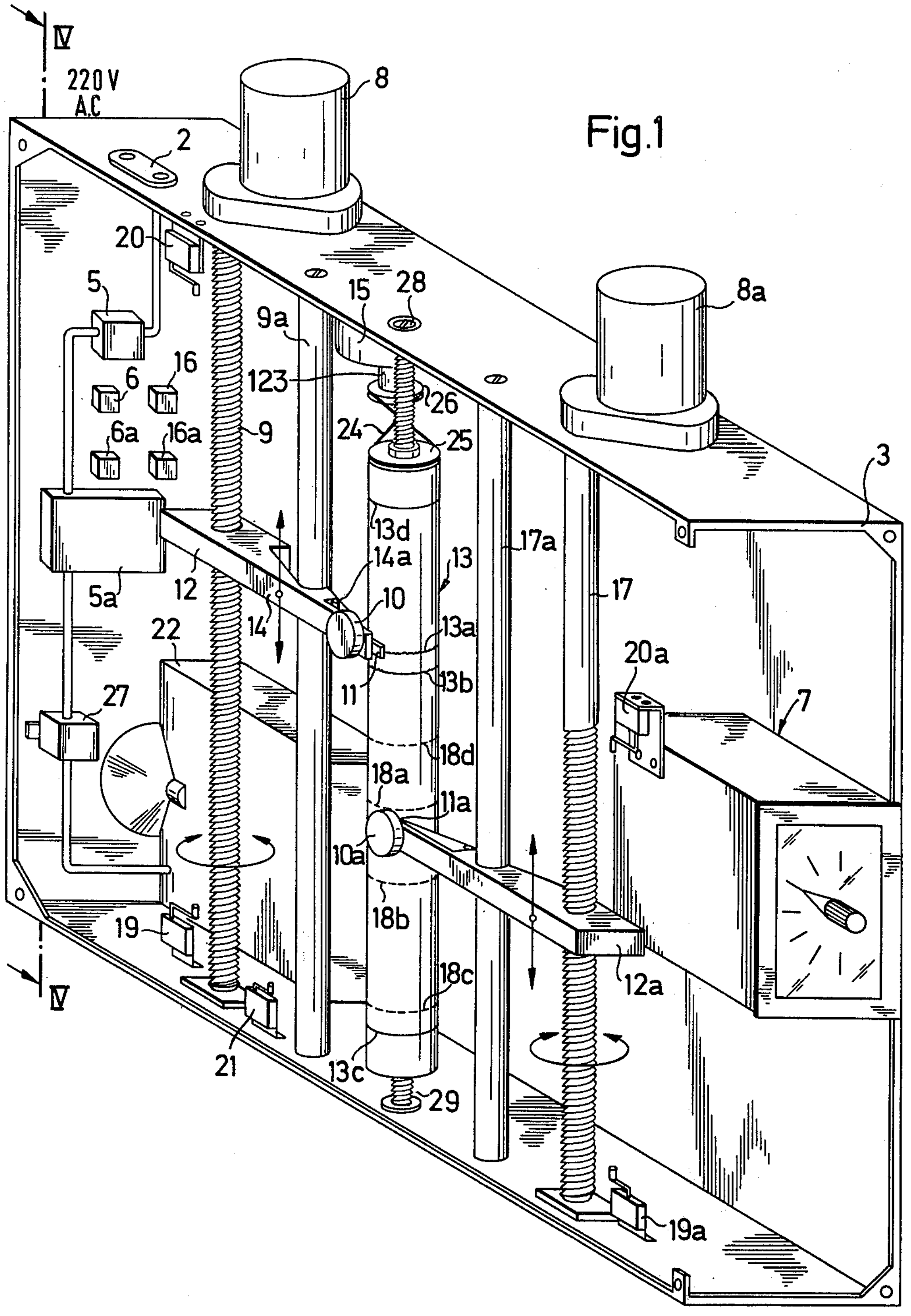
FIG. 1 is a diagrammatic perspective view from the rear part of the apparatus in which the present invention has been embodied, where the main components can be seen, since the cover has been removed.

For clarity in FIG. 1 the wires of the electric circuits have been eliminated or only diagrammatically represented. In FIG. 1 at 3 has been indicated a metal frame supporting all the electric and mechanical components of the apparatus of the invention and 2 indicates a current socket in which can be introduced an electric plug connected by a bipolar cable to an electric source of electric energy of any known type (not shown) adapted to feed the alternating current required by the apparatus.

Said source of electric current through a control switch 5, as this latter has been brought in its "ON" position, energizes a distribution panel 5a to which are connected all the electric connection wires of the electric circuits of the apparatus of this invention. A timer 7 is provided for programming the periodical operation of the apparatus. Such a timer 7 is of an electronic type having a quick automatic reset and easily available in commerce. For operating as a time keeper this timer must be set on a time interval of one minute just before the use and, of course, the accuracy of this clock depends upon the measurement sensitivity of said timer 7.

An electric motor 8 of any known type which can be programmed so as to be able to perform predetermined forward movements, as the timer 7 applies a signal to it, causes the rotation of a worm screw 9 meshing a nut screw body 12 having a laterally projecting arm 14 resting on a cylindrical rod 9a so that the body 12 can remain always in a predetermined plane which depends upon the position of the record cylinder 13.

One of the ends of the worm screw 9 is mounted for rotation on one of the side walls of the frame 3, while its opposite end is connected to the driving shaft of the motor 8 through a suitable transmission of a know type, as, for instance, a pair of gear wheels (not shown).

The cylindrical rod *9a* is connected by means of screws to both side walls of the frame 3 parallel to the worm screw 9.

As the worm screw 9 rotates, the body 12 is caused to move a predetermined distance parallel to the longitudinal axis of the worm screw 9. When this movement has been completed a cam switch 30 (shown in FIG. 5) inserted in the transmission circuit of the motor 8 switches off the circuit controlling the forward movement of this motor.

In such a way the body 12 is caused to advance only of a distance equal to the distance which there is between two adjacent circular tracks 13*a* and 13*b* which have been previously obtained on the side surface of the record cylinder 13. The sound recordings 13*a* and 13*b* shown in FIG. 3 are those concerning two of the following numbers comprised between 0 and 59, before each of them being recorded the conjuction "and" and after each of them being recorded the word "minutes."

The record cylinder 13 is made of plastics or of metal materials (as, for instance, aluminum) which are commonly used to construct the conventional sound record discs.

On the free end of the rigid arm 14 which is integral with the nut screw body 12 is mounted and electromagnet 10 which will be energized as the apparatus is put in function by the switching "ON" pushbutton 5. The electromagnet 10 causes the reading or reproducing head 11 to be lifted which is slidably mounted underneath said electromagnet by means of a small rod 14*a* so as to maintain said reproduction head out of contact with the recording track 13*a* of the record cylinder 13. This can be obtained since the rigid arm 14 rests in a suitable manner on the rod 9*a*. Thus in the rest condition the reading head 11 remains in its upraised position unless the pushbutton 27*a* is depressed (FIG. 4) controlling the change-over switch 27 causing the deenergization of the electromagnet 10. Such a deenergization is prevented in any case by the timer 7 during the very short time which is required by the motor 8 to cause the displacement of the nut screw body 12 and of the arm 14 until the position is attained in which the reproducing head 11 can rest on the next recording track 13*b* of the cylinder 13. The time required for accomplishing said forward movement of the head 11 depends upon the speed of rotation of the motor 8 and in this embodiment is of the order of some seconds and therefore consideration must be taken of such a time when the timer is calibrated.

As the motor 8 has completed the movement controlled by the timer 7, a switch 23 associated therewith (FIG. 5) controls the reset of said timer 7 in order that this latter can be put in readiness to repeat the same sequence of the aforementioned operations.

After the timer 7 has performed the series of the aforementioned operations sixty times, the reading head 11 attains the last recording track 13*c* and as the time interval of the last minute of a certain hour is elapsed, the body 12 actuates a limit relay 19 which causes the energization of the motor in such a way that the worm screw 9 now rotates in opposite rotation with respect to the preceding One. Thus the nut worm body 12 is returned up to the position in which the reproduction head 11 can rest on the recording track 13*d* (recording of the zero) of the cylinder 13. When the body 12 attains this position, it actuates also a second limit relay 20 which deenergizes the circuit controlling the reverse motion of the motor 8.

Beside to actuate the limit relay 19 the body 12, as it reaches the last recording track 13c, actuates another relay 21 which is designed to control the change of the hour; i.e. the relay 21 controls the operation of a second motor 8a provided to move forward longitudinally by means of a worm screw 17 a nut screw body 12*a* on which is mounted a reading head 11*a* of the hours in a manner similar to that of the head 11, and for a distance equal to that which is comprised between two adjacent recording tracks 18*a*, 18*b* of the cylinder 13. On the tracks 18*a*, 18*b* in this embodiment of the invention have been recorded two next numbers comprised between 0 and 23 and before each of them the word "hours" is recorded.

When the nut screw body 12*a* gets over the last recording track 18*c*, it activates a limit relay 19*a* controlling the energization of the circuit for the reversal of the motion of the motor 8*a* so as to return the head 11a carried by the body 12*a* to the position of the recording track 18*d* (zero recording), and when this movement has been completed another relay 20*a* deenergizes the circuit for the reverse motion of the motor 8*a*.

Whenever the said apparatus will be electrically connected to the source of alternating current and it is switched on by means of the switch 5, it repeats all the aforementioned operations at equal time intervals under the control of the timer 7. In order to adjust the timer 7 on a time interval of one minute, it is necessary to calibrate it on the base of a time interval corresponding to the difference between the time of one minute and the few seconds which are necessary to perform the mechanic displacements of the reading heads 11 and 11a.

If the time keeper of this invention has not been used for a certain time it is necessary to effect its adjustment; for such a purpose it is sufficient to depress the pushbutton 6 or the pushbutton 6a so as to move back the reading head 11 (FIG. 4) according to the regulation which has to be performed. The same operations can be made by means of the pushbuttons 16 and 16*a* as far as the hours are concerned. For accomplishing such regulations it is necessary to know what time it is so as to be able to bring the reproduction heads in the respective positions which correspond to the hour and minute of the regulation instant. This can be accomplished by actuating the pushbutton 27*a* of the change-over switch 27 energizing the reproduction circuit 22.

The reproduction or audio circuit 22 can be any one of the well known reproduction circuits employed in recorders, record players, etc. and therefore it will be not described in detail.

The change-over switch 27 controls the energization of the motor 15 mounted in a suitable position on the same side wall on which are mounted the motors 8, 8*a*. To the shaft 23 of the motor 15 a belt transmission is connected including a trapezoidal transmission belt 24 and two pulleys 25, 26 respectively fixed on the driving shaft 23 of the motor 15 and on the record cylinder 13. This latter is mounted for a free rotation on both side opposite walls of the frame 3 with the interposition of longitudinal adjusting screws 28 and 29. In this way the cylinder 13 rotates parallel to the worm screws 9 and 17 as well as to the cylindrical rods 9a and 17*a*.

Further the change-over switch 27 causes the deenergization of the electromagnets 10 and 10*a*, allowing the reading heads 11 and 11a to rest on the recording tracks 13*b* and 18*b* of the cylinder 13 which is rotating.

As the pushbutton 27*a* is depressed, the change-over switch 27 causes also the energization of the relay 32 which in turn energizes alternately the reading head 11 of the minutes and the reading head 11*a* of the hours at each revolution of the cylinder 13.

In this way it becomes possible to listen for the speaking time keeper of the invention so as to know what time it is with the accuracy of one minute by means of the reproduction circuit 22 to which the reading heads 11 and 11*a* are connected.

In order to allow that the speaking time keeper of the invention can act as an alarm clock, the electromagnets 10 and 10*a*, the reading heads 11 and 11a and the reproduction circuit 22 can be automatically energized at any desired instant by means of two relays 31 and 33 controlled by index levers 34 and 35 (FIG. 5).

Thus these relays 31 and 33 can be respectively regulated on the desired hour and minute by means of the two index levers 34 and 35 (FIG. 2) slidable along slits 36 and 37 respectively associated with graduated scales arranged on the cover 38 of the casing 3.

Along the slits 36 and 37 there are the scales of the numbers from 0 to 59 representative of the minutes and the numbers from 0 to 23 representative of the hours of a day respectively.

By moving the index levers 34 and 35 up to the positions corresponding to the desired hour and minute (on the half past six as shown in FIG. 2), the reproduction will be automatically obtained, beginning from this time, and it will be continued without any interruption up to the deenergization of the apparatus due to the actuation of the switch 39.

The recordings performed on the tracks 18*a*, 18*b*,... and 13*a*, 13*b*,... are obtained on the cylinder 13 in such a manner to be synchronized and phonically reproduceable.

Said recordings are obtained on the record cylinder 13 by means of an apparatus similar to that which has been hereinbefore described, only substituting the reproduction circuit with a recording circuit of known type.

The present invention has been described with reference to an embodiment provided to obtain a speaking time keeper, i.e. a clock giving audio reproductions, but it will be apparent that several modifications and changes can be applied to such an embodiment without departing of the field and purposes of this invention.

It is thus possible to record not only the hours and minutes, but also sentences for which can be automatically listened at the moment of the early call or as it is manually controlled; some of the electromechanical components could be also substituted with equivalent electronic components.

Further provision could be made to employ more than two electronically controlled reading heads so as to announce recordings effected on circumferential tracks indicating general other physical qualities.

In fact when a physical quantity has been measured by any suitable known means, according to the present invention and after suitably modifying the shown embodiment, it will be possible to substitute the optical survey of the measured values with an audio reproduction of these latter. Such an audio reproduction consists in the reproduction of the measurements of the considered quantity or magnitude in whichever desired spoken language.

I claim:

1. Apparatus for announcing messages representing measurements of physical quantities, comprising in combination:

a record cylinder having a series of circumferentially extending record tracks thereon disposed in longitudinally spaced relation along said cylinder, each record track being circular such that the end thereof merges with its beginning;

a read head mounted adjacent said record cylinder for movement into and out of pick-up relation with respect to said record cylinder and for movement along the length of said cylinder;

means for causing said record cylinder to rotate on command and for an integral number of revolutions;

means for causing said read head to move into pick-up position in consonance with rotation of said record cylinder and for causing said read head to move out of pick-up position in consonance with stopping of said record cylinder;

timer means for continuously moving said read head along the length of said cylinder from one fixed position aligned with a particular record track to another fixed position aligned with another record track only when said pick-up head is out of pick-up position; and means for automatically resetting said read head in its starting position at the end of its longitudinal movement along said record cylinder.

2. Apparatus as defined in claim 1 including a second record cylinder having a series of circumferentially extending record tracks thereon disposed in longitudinally spaced relation along said second cylinder, each of the record tracks of said second cylinder being circular such that the end thereof merges with its beginning, the record tracks of the cylinder first mentioned having successive minutes recorded thereon and the record tracks of said second cylinder having successive hours recorded thereon;

a second read head connected with said audio system and mounted adjacent said second cylinder for movement into and out of pick-up relation with respect to said second cylinder and for movement along the length of said second cylinder;

said timer means being operatively associated with said read head first mentioned and said second read head for stepping said first read head from one record track to the next at minute intervals and for stepping said second read head from one track to the next at hour intervals; and control means operating to rotate said second cylinder and move said second read head into pick-up relation with said second cylinder and then to rotate said first cylinder and move said first read head into pick-up relation to said first cylinder.

3. Apparatus as defined in claim 2 wherein said timer means comprises a timer and first and second motors periodically energized by said timer, said first motor having a feed screw carrying said first read head and said second motor having a feed screw carrying said second read head.

4. Apparatus as defined in claim 2 including manual control means for selectively positioning said first and second read heads at selected record tracks.

5. Apparatus as defined in claim 2 wherein said control means is manually actuated.

6. Apparatus as defined in claim 2 including manual setting means for actuating said control means automatically beginning at a selected time whereby the apparatus functions in the manner of an alarm clock.

* * * * *